(12) United States Patent
Lazaredes

(10) Patent No.: US 7,361,274 B2
(45) Date of Patent: Apr. 22, 2008

(54) AERATION METHOD

(75) Inventor: Huw Alexander Lazaredes, North Richmond (AU)

(73) Assignee: Siemens Water Technologies Corp., Warrendale, PA (US)

(*) Notice: Subject to any disclaimer, the term of this patent is extended or adjusted under 35 U.S.C. 154(b) by 0 days.

(21) Appl. No.: 11/060,106

(22) Filed: Feb. 16, 2005

(65) Prior Publication Data

US 2005/0139538 A1 Jun. 30, 2005

Related U.S. Application Data

(63) Continuation of application No. PCT/AU03/01068, filed on Aug. 21, 2003.

(30) Foreign Application Priority Data

Aug. 21, 2002 (AU) ............... 2002950934

(51) Int. Cl.
*B01D 65/02* (2006.01)
(52) U.S. Cl. ............ 210/636; 210/321.69; 210/321.89
(58) Field of Classification Search ........... 210/321.69, 210/321.79, 321.8, 321.89, 321.9, 500.23, 210/636, 639, 650, 651, 409–415, 791–798; 55/431; 96/8
See application file for complete search history.

(56) References Cited

U.S. PATENT DOCUMENTS

| 4,647,377 | A | | 3/1987 | Miura | |
|---|---|---|---|---|---|
| 4,876,006 | A | * | 10/1989 | Ohkubo et al. | ........ 210/321.89 |
| 5,192,456 | A | | 3/1993 | Ishida et al. | |
| 5,209,852 | A | | 5/1993 | Sunaoka et al. | |
| 5,248,424 | A | | 9/1993 | Cote et al. | |
| 5,271,830 | A | | 12/1993 | Faivre et al. | |
| 5,480,553 | A | | 1/1996 | Yamamori et al. | |
| 5,607,593 | A | * | 3/1997 | Cote et al. | ........... 210/650 |
| 5,639,373 | A | | 6/1997 | Mahendran et al. | |
| 5,643,455 | A | | 7/1997 | Kopp et al. | |
| 5,783,083 | A | | 7/1998 | Henshaw et al. | |
| 5,910,250 | A | * | 6/1999 | Mahendran et al. | ........ 210/636 |
| 5,944,997 | A | * | 8/1999 | Pedersen et al. | ........... 210/636 |
| 5,958,243 | A | | 9/1999 | Lawrence et al. | |
| 6,045,698 | A | | 4/2000 | Cote et al. | |

(Continued)

FOREIGN PATENT DOCUMENTS

DE    298 04 927    6/1998

(Continued)

OTHER PUBLICATIONS

Kaiya et al., "Water Purification Using Hollow Fiber Microfiltration Membranes," 6th World Filtration Congress, Nagoya, 1993, pp. 813-816.

(Continued)

*Primary Examiner*—Joseph Drodge

(57) ABSTRACT

A method and filtration module (5) for providing gas bubbles within an array of vertically disposed porous hollow membranes (6) to clean the outer surfaces of said membranes (6) when the array is immersed in a liquid by feeding (10) the gas bubbles into the array transversely of the vertical axis of the array. In one preferred form, the gas bubbles are retained within the array using a sleeve (11) surrounding the array (6) at least along part of its length.

17 Claims, 3 Drawing Sheets

U.S. PATENT DOCUMENTS

| | | | |
|---|---|---|---|
| 6,126,819 | A | 10/2000 | Heine et al. |
| 6,156,200 | A * | 12/2000 | Zha et al. ............... 210/321.89 |
| 6,193,890 | B1 | 2/2001 | Pedersen et al. |
| 6,214,231 | B1 | 4/2001 | Cote et al. |
| 6,245,239 | B1 | 6/2001 | Cote et al. |
| 6,284,135 | B1 | 9/2001 | Ookata |
| 6,325,928 | B1 | 12/2001 | Pedersen et al. |
| 6,375,848 | B1 | 4/2002 | Cote et al. |
| 6,406,629 | B1 | 6/2002 | Husain et al. |
| 6,485,645 | B1 | 11/2002 | Husain et al. |
| 6,524,481 | B2 | 2/2003 | Zha et al. |
| 6,550,747 | B2 | 4/2003 | Rabie et al. |
| 6,555,005 | B1 | 4/2003 | Zha et al. |
| 6,641,733 | B2 | 11/2003 | Zha et al. |
| 6,656,356 | B2 | 12/2003 | Gungerich et al. |
| 6,706,189 | B2 | 3/2004 | Rabie et al. |
| 6,708,957 | B2 | 3/2004 | Cote et al. |
| 6,841,070 | B2 | 1/2005 | Zha et al. |
| 6,863,817 | B2 | 3/2005 | Liu et al. |
| 6,863,823 | B2 | 3/2005 | Cote |
| 6,881,343 | B2 | 4/2005 | Rabie et al. |
| 6,893,568 | B1 | 5/2005 | Janson et al. |

FOREIGN PATENT DOCUMENTS

| | | |
|---|---|---|
| EP | 1 034 835 | 9/2000 |
| JP | S63-38884 | 7/1986 |
| JP | 61-242607 | 10/1986 |
| JP | 61-291007 | 12/1986 |
| JP | 61-293504 | 12/1986 |
| JP | 62-250908 | 10/1987 |
| JP | 63-143905 | 6/1988 |
| JP | 04-250898 | 9/1992 |
| JP | 04-265128 | 9/1992 |
| JP | 05-096136 | 4/1993 |
| JP | 05-285348 | 11/1993 |
| JP | 06-218237 | 8/1994 |
| JP | 06-285496 | 10/1994 |
| JP | 06-343837 | 12/1994 |
| JP | 07-024272 | 1/1995 |
| JP | 07-136471 | 5/1995 |
| JP | 07-155758 | 6/1995 |
| JP | 07-185268 | 7/1995 |
| JP | 07-185271 | 7/1995 |
| JP | 07-303895 | 11/1995 |
| JP | 09-099227 | 4/1997 |
| JP | 09-220569 | 8/1997 |
| JP | 10-085565 | 4/1998 |
| JP | 11-165200 | 6/1999 |
| WO | WO 93/02779 | 2/1993 |
| WO | WO 93/15827 | 8/1993 |
| WO | WO 98/28066 | 7/1998 |

OTHER PUBLICATIONS

Ueda et al., "Effects of Aeration on Suction Pressure in a Submerged Membrane Bioreactor," *Wat. Res.* vol. 31, No. 3, 1997, pp. 489-494.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Zenon, "Proposal for ZeeWeed® Membrane Filtration Equipment System for the City of Westminster, Colorado, Proposal No. 479-99," Mar. 2000, entire publication.

Johnson, "Recent Advances in Microfiltration for Drinking Water Treatment," AWWA Annual Conference, Jun. 20-24, 1999, Chicago, Illinois, entire publication.

* cited by examiner

AERATION METHOD

RELATED APPLICATION

This application is a continuation, under 35 U.S.C. § 120, of International Patent Application No. PCT/AU2003/001068, filed on Aug. 21, 2003, under the Patent Cooperation Treaty (PCT), which was published by the International Bureau in English on Mar. 4, 2004, which designates the United States, and which claims the benefit of Australian Patent Application No. 2002950934, filed Aug. 21, 2002.

FIELD OF THE INVENTION

The present invention relates to membrane filtration systems and more particularly to an improved backwash method and apparatus.

BACKGROUND OF THE INVENTION

The use of membrane filtration systems is growing rapidly. The success of such systems is largely dependent on employing effective and efficient membrane cleaning methods. Commonly used physical cleaning methods include backwash (backpulse, backflush) using liquid permeate or a gas, and membrane scrubbing or scouring using a gas in the form of bubbles in a liquid. Examples of this second type of method are illustrated in U.S. Pat. No. 5,192,456 to Ishida et al, U.S. Pat. No. 5,248,424 to Cote et al, U.S. Pat. No. 5,639,373 to Henshaw et al, U.S. Pat. No. 5,783,083 to Henshaw et al and our PCT Application Nos WO98/28066 and WO00/18498.

These prior art systems use a variety of techniques to introduce gas bubbles into the membrane arrays to produce effective and efficient surface cleaning. It has been found that effective cleaning is achieved by introducing bubbles into the array in a uniform manner and retaining the bubbles within the array as much as possible to produce efficient cleaning of the membrane surfaces.

SUMMARY OF THE INVENTION

One object of the present invention is to provide an improved method and apparatus for introducing gas into a membrane array which overcomes or at least ameliorates one or more of the disadvantages of the prior art or at least provides a useful alternative.

According to a first aspect, the present invention provides a method of providing gas bubbles within an array of vertically disposed porous hollow membranes to clean the outer surfaces of said membranes when said array is immersed in a liquid, the method comprising the steps of feeding gas bubbles into said array transversely of the vertical axis of said array.

Preferably, said method includes the step of retaining said gas bubbles within said array using a sleeve surrounding said array at least along part of its length.

According to a further aspect, the present invention provides a membrane filtration module including a plurality of vertically disposed porous hollow membranes adapted, in use, to be immersed in a liquid, gas feeding means adapted to feed gas bubbles into said array transversely of the vertical axis of said array.

For preference, said module further includes a sleeve surrounding said array at least along part of its length for retaining said gas bubbles within the array. Preferably, the sleeve extends along 17% or greater of the length of the array.

Preferably, said porous hollow membranes comprise hollow fibre membranes. For preference, the fibre membranes are formed in a generally cylindrical bundle. For further preference, said sleeve is located adjacent and above the gas feeding means. Preferably, the gas feeding means comprises a tube adapted to extend around the periphery of the array of membranes, the tube having a plurality of openings located on its inner surface adjacent the array of membranes for feeding gas into the membrane array. For preference, a number of gas feeding means are provided along the length of the array or bundle. Preferably, the openings in the tube include extensions in the form of tubes adapted to extend into the array. For preference, the sleeve extends along a major portion of the length of said membranes.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

The preferred embodiment relates to porous hollow fibre membranes, however, it will be appreciated that the invention is not limited to such an application and is equally applicable to other similar arrays of membranes.

Figure 1:
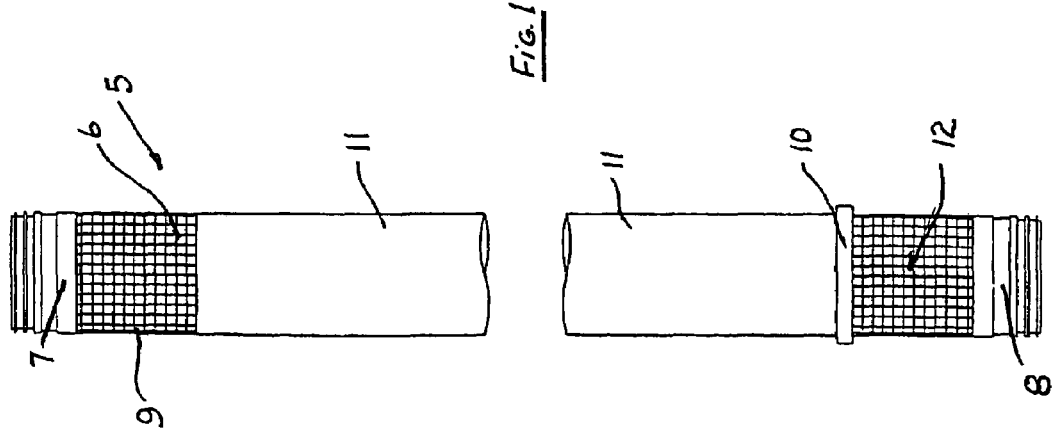
FIG. 1 shows a broken side elevation view of a hollow fibre membrane module with a gas feeding ring according to an embodiment of the invention.

Referring to the drawings, a fibre membrane module 5 is shown in FIG. 1 comprising a bundle of hollow fibre membranes 6 extending between an upper and lower potting sleeves 7 and 8, respectively. The fibre membranes 6 are supported by a screen 9 also extending between the sleeves 7 and 8.

The gas feeding ring 10 is fitted around the circumference of the fibre bundle 6 at a location spaced from the lower potting sleeve 8. A tube or sleeve 11 is placed around the bundle 6 above the gas feeding ring 10 and extends along the length of the bundle 6. The tube 11 may be formed as a solid tube or by wrapping a suitable sheet material around the fibre bundle 6. The tube material should be impervious to the gas bubbles so they are retained within the fibre bundle but need not be liquid impervious. A region 12 above and below the potting sleeves is left uncovered by the tube 11 to allow entry of feed to the fibre membranes as well as removal of material backwashed from the membranes by usual processes as well as bubbles fed into the bundle by the gas feeding ring 10.

Figure 2:
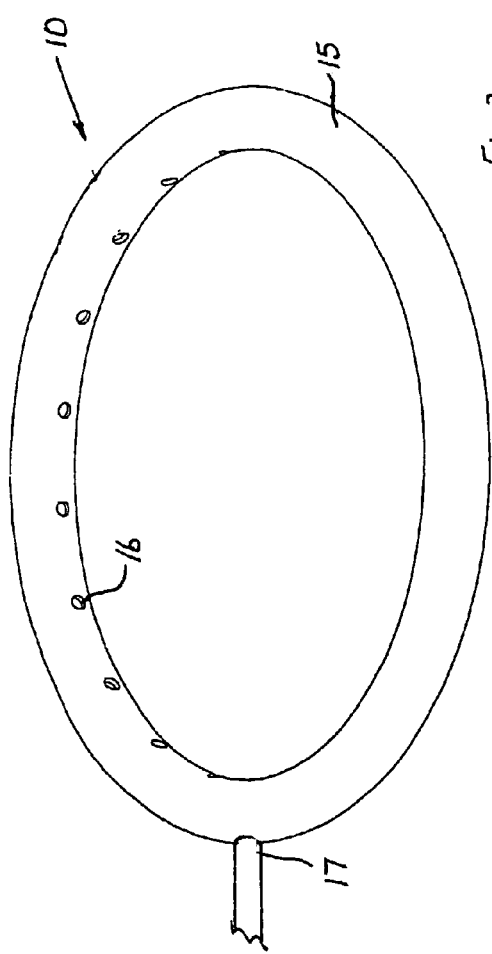
FIG. 2 shows a perspective view of the gas feeding ring of FIG. 1.
Figure 3:
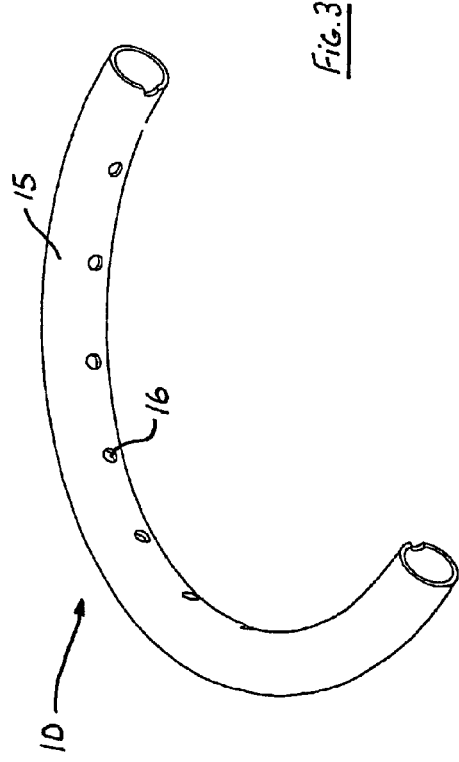
FIG. 3 shows a cutaway perspective view of the gas feeding ring of FIG. 2.

FIGS. 2 and 3 show the gas feeding ring 10 in more detail. The ring is an annular tube 15 having spaced holes or openings 16 formed around its inner circumference to allow gas to be fed into the fibre array when the ring is placed around the bundle as shown in FIG. 1. Gas or air may be supplied to the ring 10 through a port 17 in one side of the ring.

Figure 4:
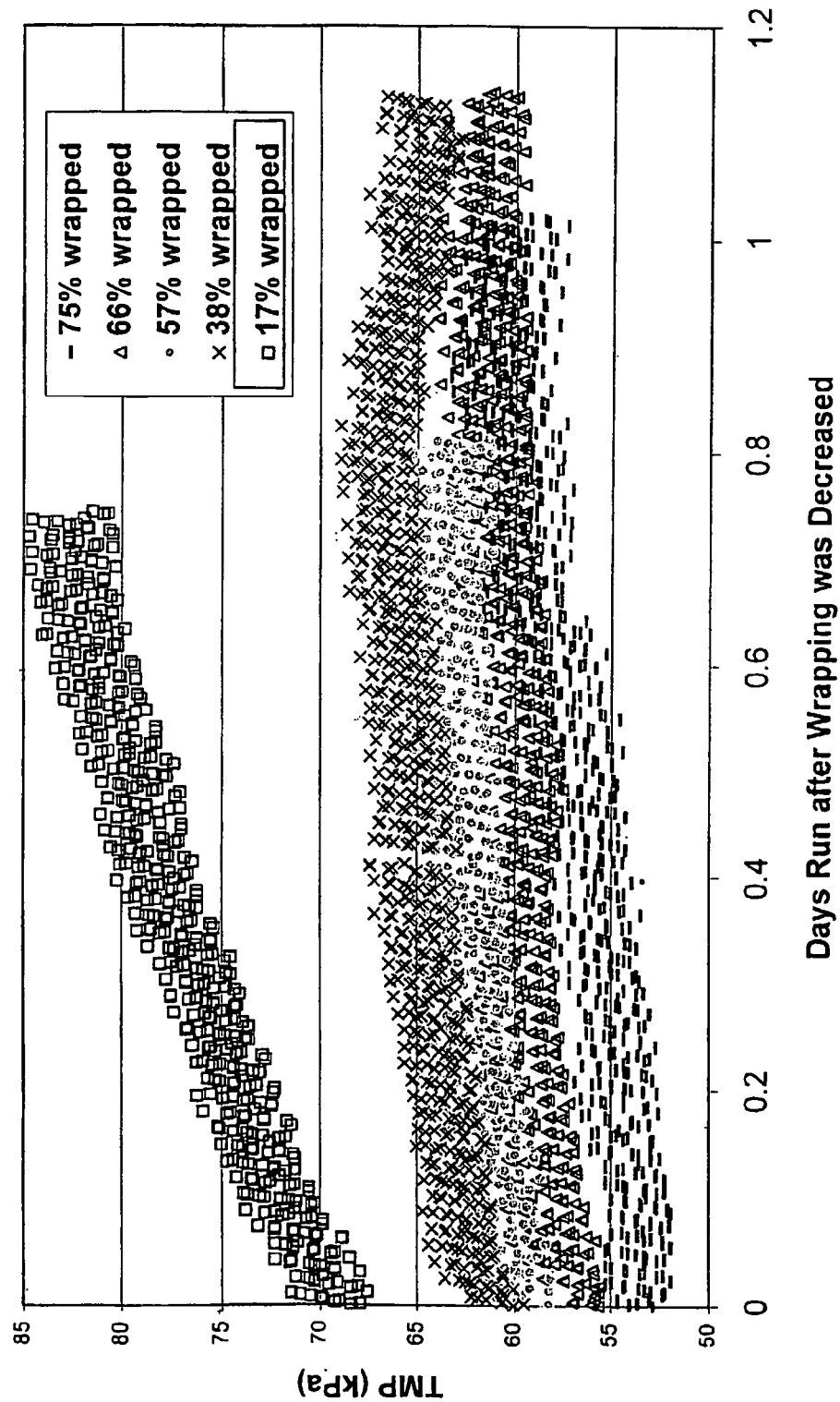
FIG. 4 shows a graph of transmembrane pressure (TMP) vs time running of a filtration module for different percentage lengths of the wrapping of the module.

The system provides a number of advantages. Air or gas can be fed into the membrane bundle at a number of locations along its length by use of a number of gas feeding rings. This enables more uniform provision of gas scouring bubbles within the bundles. Retention of bubbles within the bundle by the tube or sleeve 11 produces a more efficient scouring of the fibre surfaces. Provision of scouring bubbles in this way, independent of the fibre headers, allows filtrate to be withdrawn from either of both ends of the fibre module and allows reverse filtration from either or both ends of the fibre module when backwashing. FIG. 4 illustrates the reduction in increase of TMP with increased sleeve or wrapping length along the fibre bundle.

It will also be appreciated that further embodiments and exemplifications of the invention are possible without departing from the spirit or scope of the invention described.

What is claimed is:

1. A method of cleaning outer surfaces of membranes for use in filtering a liquid, the method comprising the steps of:
   providing a bundle of porous hollow fiber membranes mounted between upper and lower potting sleeves and immersed in the liquid; and
   directing gas bubbles toward the bundle from around a circumference of the bundle transversely of a vertical axis of the bundle with one or more gas feeding rings fitted around the circumference of the bundle at locations spaced from the potting sleeves, the ring comprising a tube having an axis extending circumferentially around the bundle and having spaced openings formed to allow gas to be fed inwardly toward the bundle.

2. The method of claim 1, wherein the method further comprises the step of:
   retaining the gas bubbles within the bundle with a sleeve surrounding the bundle along at least a part of a length of the bundle.

3. The method of claim 1, further comprising withdrawing filtrate from either or both of the upper and lower potting sleeves.

4. The method of claim 1, further comprising backwashing the module from either or both of the upper and lower potting sleeves.

5. A membrane filtration module comprising a bundle of porous hollow fiber membranes mounted in a lower potting sleeve and one or more gas feeding rings fitted around a circumference of the bundle at locations spaced from the lower potting sleeve, the ring comprising a tube having an axis extending circumferentially around the bundle and having spaced openings formed to allow gas to be fed inwardly toward the bundle.

6. The membrane filtration module according to claim 5, wherein the module further comprises a sleeve positioned about the bundle along at least a part of a length of the bundle, wherein the sleeve is impervious to the gas bubbles.

7. The membrane filtration module according to claim 6, wherein the sleeve extends along about 17% or greater of the length of the bundle.

8. The membrane filtration module according to claim 6, wherein the sleeve extends along a major portion of a length of the bundle.

9. The membrane filtration module according to claim 6, wherein the sleeve is situated adjacent to the gas feeding ring and above the gas feeding ring.

10. The membrane module according to claim 5, wherein the bundle is generally cylindrical.

11. The membrane filtration module according to claim 5, wherein the spaced openings of the gas feeding ring are positioned on an inner circumference of the gas feeding ring.

12. The membrane filtration module according to claim 11, wherein the gas feeding ring further comprises tube extensions positioned about the spaced openings.

13. The membrane filtration module according to claim 5, further comprising a plurality of gas feeding rings positioned along a length of the bundle.

14. The membrane filtration module according to claim 5, further comprising a screen positioned about the porous hollow membranes.

15. The membrane filtration module according to claim 5, wherein the porous hollow membranes are disposed vertically.

16. The module of claim 5, wherein the gas feeding ring is configured to direct gas bubbles toward the bundle from around the circumference of the bundle transversely of a vertical axis of the bundle.

17. The module of claim 5, wherein the gas feeding ring is configured to provide scouring bubbles independently of the lower potting sleeve or an upper potting sleeve.

* * * * *